United States Patent [19]

Mesnel

[11] Patent Number: 4,470,223
[45] Date of Patent: Sep. 11, 1984

[54] SEALS FOR SLIDING AUTOMOBILE WINDOWS

[75] Inventor: Francois Mesnel, Neuilly-sur-Seine, France

[73] Assignee: Etablissements Mesnel, Carrieres-sur-Seine, France

[21] Appl. No.: 465,208

[22] Filed: Feb. 9, 1983

[30] Foreign Application Priority Data

Feb. 15, 1982 [FR] France .............................. 82 02399

[51] Int. Cl.³ .............................................. E06B 7/23
[52] U.S. Cl. ...................................... 49/441; 49/441; 52/716
[58] Field of Search ............... 49/441, 440, 488, 489, 49/490, 491; 52/716

[56] References Cited

U.S. PATENT DOCUMENTS

| 3,333,364 | 8/1967 | Herr ....................................... 49/441 |
| 3,401,075 | 9/1968 | Jackson ............................. 49/441 X |
| 3,448,550 | 6/1969 | Herr et al. ......................... 49/440 X |
| 3,547,516 | 12/1970 | Shanor et al. ...................... 52/716 X |
| 4,351,864 | 9/1982 | Giannakidis ........................ 52/716 X |

FOREIGN PATENT DOCUMENTS

| 1362029 | 4/1964 | France . |
| 1510184 | 12/1967 | France . |
| 93308 | 2/1969 | France . |
| 2307450 | 11/1976 | France . |
| 2468717 | 5/1981 | France . |
| 1033784 | 6/1966 | United Kingdom . |
| 2075101 | 11/1981 | United Kingdom .................. 49/488 |
| 2085513 | 4/1982 | United Kingdom .................. 49/441 |

Primary Examiner—Philip C. Kannan
Attorney, Agent, or Firm—Schwartz, Jeffery, Schwaab, Mack, Blumenthal & Koch

[57] ABSTRACT

Weather stripping/sealing structure for use in conjunction with sliding automotive vehicle door windows includes a pair of extruded, elastomeric sealing members and a spacer brace connecting them together along the upper and side portions of the window, the entire assembly being inserted within the door window opening. The sealing members include a pair of gripping portions secured to the door window openings and window contacting portions having flocking thereon for sealing the window edges when closed. A decorative strip may be secured to the outside of one of the gripping portions.

14 Claims, 7 Drawing Figures

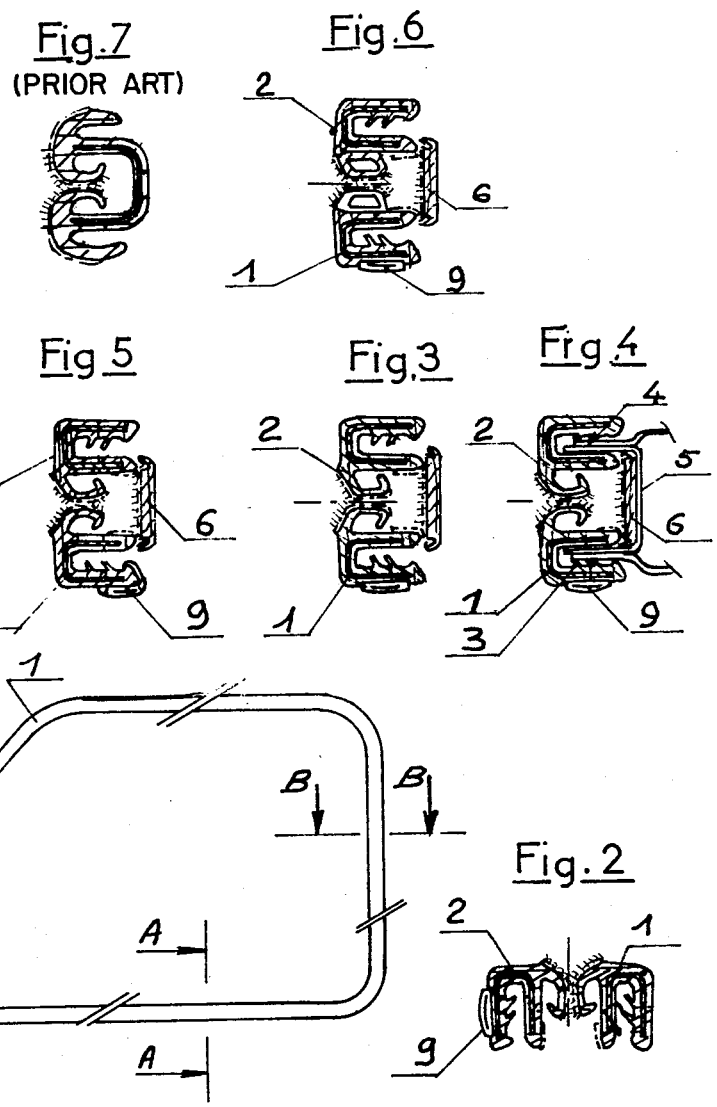

SEALS FOR SLIDING AUTOMOBILE WINDOWS

BACKGROUND OF THE INVENTION

1. Field of The Invention

The invention relates to window seals, and more particularly to seals for surrounding sliding windows in automobile door frames.

2. Prior Art

Automobile door frames are no longer assembled and shaped by bending the metal profile in the form of a U-shaped window frame, but are now formed by stamping double door frames comprising an inner panel and outer panel joined together to form a frame for the sliding window. The sealing means around and receiving the sliding window is attached to the door frame and may include finishing trim thereon. This involves numerous problems including increased assembly costs and the introduction of fasteners which can become loose and/or oxidized.

SUMMARY OF THE INVENTION

It is an object of the instant invention to eliminate or reduce the disadvantages found in the prior art. This is accomplished by means of the novel structure of the instant invention which includes a pair of shaped, gripping and covering frame elements or enclosures. The frame elements are adapted to the periphery of the openings for receiving the sliding glass window therein and are assembled to the double door frame. This assembly is capable of providing a simple and automatic method of installation and fastening of the sealing frame elements in the opening. A spacer brace is positioned between the frame elements and extends between the two portions of the double door frame. The spacer brace is limited to the upper part and two side portions of the circumference of the window, the window being permitted to slide between the lower sealing/weatherstrip elements into the body of the double door frame. Flocking is provided on the surfaces which contact the sliding glass, and the door includes conventional sliding mechanisms, together with the usual glass installation and handling elements.

BRIEF DESCRIPTION OF THE DRAWINGS

The above and other advantages and features of the invention will be better understood from the following description and accompanying drawings wherein:

FIG. 1 illustrates a schematic elevation view in reduced scale of complimentary portions of a door enclosure according to the instant invention with sealing means around the periphery for receiving a sliding glass window;

FIG. 2 is an enlarged cross-section taken along lines A—A of FIG. 1 and showing the lower portion of the door window seal;

FIG. 3 shows an enlarged cross-section taken along lines B—B of FIG. 1 showing the upper and side portions of the window and including a supplemental spacer brace means;

FIG. 4 shows the same cross-section as FIG. 3, but further includes an assembly installed on the double door;

FIG. 5 shows another embodiment similar to FIG. 3, but further includes a decorative trim fastened thereto;

FIG. 6 shows yet another embodiment including a pair of small cellular rubber tubes which are flocked and are substituted for the guiding sealing lips shown in the previously described embodiments; and FIG. 7 illustrates a transverse cross-section of a conventional slide for guidance of glass automotive windows.

DETAILED DESCRIPTION OF THE INVENTION

Referring to the figures in the drawing, particularly FIG. 4, a pair of unitary cooperating sealing frame elements 1 and 2 having symmetrical configurations are positioned around the periphery of openings 3 and 4 of the double door frame. The elements and door frame are connected together by a brace 5. The elements are made by means of a known extrusion process and are formed of elastomeric "plastic" material and have a metal center core therein. Each element has "flocked" inner lips integral therewith for contacting the sliding glass window.

The construction of the elements 1 and 2 permit easy installation while one simultaneously tightens a spacer brace 6 which has flocking on the inner face thereof, i.e., on the portion against which the glass window abuts. It should be noted that installation is first facilitated by placing the assembly on the vertical post in an oblique fashion and followed by tilting and sliding, thereby automatically insuring the tightening and fastening of the assembly on each portion of the door up to the free extremities 7 and 8 which abut against the deflector post or an auxiliary element such as the fixture for retaining a rear view mirror.

It will be appreciated, of course, that the installation of the spacer brace 6 is limited to the side and upper portions of the window frame; whereas, the lower horizontal portion has no brace to permit the passage of the glass between the pair of flocked inner lips as in FIG. 2. The flocked inner lips can be replaced, for example, by tubular elements as seen in FIG. 6.

One or both of the sealing elements can be provided with a decorative strip or ribbon 9 which may be, for example, of a polished metal and mat or highly polished metal and which can even be deposited by electrolysis and protected against oxidation and ultraviolet radiation by a transparent film or sheathing, for example, of the type commercially known as "Mylar", a polyester film, or "Tedlar", a fluoride film, with the decorative elements 9 being maintained in a known manner by fastening, adhesive bonding or thermal welding.

Finally, FIG. 7 illustrates a transverse cross-section of a conventional sliding glass automobile window which needs no description and shows the prior art.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. Weather stripping/sealing structure for use in conjunction with sliding automotive vehicle door windows and the like, comprising:

(a) a pair of extruded elastomeric sealing members, each having a gripping portion having a metal core therein and a window contacting portion integral with said gripping portion;
(b) said gripping portions engaging the periphery of the vehicle door window openings; and
(c) a separate spacer brace attached between said elements around a portion of said window opening, said spacer brace having a window contacting portion which cooperates with said window contacting portions of said elastomeric sealing members to form a complete window seal.

2. The structure of claim 1 wherein said elements and spacer brace are placed on the periphery of the door window in an oblique manner, followed by straightening and sliding until the ends of the assembly abut the edge of the window.

3. The structure of claim 1 wherein said spacer brace has flocking on the inner surface thereof.

4. The structure of claim 1 including flocking on at least a portion of said window contacting portion.

5. The structure of claim 1 wherein said window contacting portion includes a lip.

6. The structure of claim 1 wherein said window contacting portion includes tubular elements.

7. The structure of claim 1 wherein at least one of said gripping portions includes decorative means thereon.

8. The structure of claim 7 wherein said decorative means is in the form of metal.

9. The structure of claim 7 wherein said decorative means is deposited thereon by electrolysis.

10. The structure of claim 7 wherein said decorative means is bonded thereon.

11. The structure of claim 7 including oxidation and ultraviolet radiation protection means on at least a portion of said decorative means.

12. In combination, a vehicle door having a sliding window opening, and weather sealing on said window opening, said window opening having one side through which a window may pass, and other sides against which a window may abut, said window opening having an inner peripheral edge and an outer peripheral edge, said edges being connected by a brace along said other sides, said weather sealing comprising:

a separate first sealing element comprising a first elastomeric sealing member having a first gripping portion gripping said inner peripheral edge, said first gripping portion having a metal core surrounding said inner peripheral edge, and a first window contacting portion integral with said first gripping portion, said first window contacting portion facing generally toward said outer peripheral edge;

a separate second sealing element comprising a second elastomeric sealing member having a second gripping portion gripping said outer peripheral edge, said second gripping portion having a metal core surrounding said outer peripheral edge, and a second window contacting portion integral with said second gripping portion, said second window contacting portion facing generally toward said outer peripheral edge and said first window contacting portion such that said first and second window contacting portions form a seal against a window received therebetween; and a separate third sealing element comprising a spacer brace attached to said brace along said other sides, said spacer brace having a window contacting portion facing toward said window opening.

13. The combination according to claim 12, wherein said first sealing element comprises a single piece extending along all of said sides, said second element comprises a separate single piece extending along all of said sides, and said third sealing element comprises a single piece extending along all of said other sides.

14. The combination according to claim 12, wherein each of said window contacting surfaces comprises flocking.

* * * * *